United States Patent [19]

Isozumi et al.

[11] Patent Number: 5,129,271

[45] Date of Patent: Jul. 14, 1992

[54] COAXIAL ENGINE STARTER

[75] Inventors: Shuzoo Isozumi; Keiichi Konishi, both of Himeji City, Japan

[73] Assignee: Mitsubishi Denki K.K., Tokyo, Japan

[21] Appl. No.: 699,838

[22] Filed: May 14, 1991

Related U.S. Application Data

[62] Division of Ser. No. 481,077, Feb. 16, 1990, Pat. No. 5,044,212.

[30] Foreign Application Priority Data

Feb. 17, 1989 [JP] Japan .................................. 1-38681
Apr. 20, 1989 [JP] Japan .................................. 1-102210

[51] Int. Cl.$^5$ .............................................. F02N 15/00
[52] U.S. Cl. ........................................ 74/7 R; 74/7 C; 290/48
[58] Field of Search ................ 74/7 R, 7 A, 7 C, 7 E; 290/38 C, 48

[56] References Cited

U.S. PATENT DOCUMENTS

| | | | |
|---|---|---|---|
| 3,772,921 | 11/1973 | Carlson et al. | 74/7 A |
| 4,862,027 | 8/1989 | Isozumi et al. | 74/7 A X |
| 4,902,905 | 2/1990 | Morishita | 74/7 A X |
| 4,918,324 | 4/1990 | Isozumi | 74/7 A X |
| 4,947,052 | 8/1990 | Isozumi | 74/7 C X |

Primary Examiner—Allan D. Herrmann
Assistant Examiner—David W. Laub
Attorney, Agent, or Firm—Sughrue, Mion, Zinn Macpeak & Seas

[57] ABSTRACT

An engine starter comprising an electric motor having a hollow armature rotary shaft, a solenoid switch for energizing the electric motor and having a push rod extending into the into the hollow armatur rotary shaft, an output rotary shaft having a pinion disposed on a front end thereof, the output rotary shaft being axially slidable relative to the armature rotary shaft to move the pinion into and out of engagement with an engine ring gear. A clutch outer member of an over-running clutch unit is mounted on the output rotary shaft and is connected to the electric motor for being rotated thereby, and a clutch inner member driven by the clutch outer member through a plurality of rollers is provided with helical splines on its inner circumferential surface. In order to transmit a rotational force from the clutch inner member to the output rotary shaft through splines, a ring member having teeth on its outer circumference and in engagement with the helical splines of the clutch inner member, and a stopper for limiting axial movement of the ring member on the output rotary shaft beyond the stopper are disposed. The pinion may be integral with the output rotary shaft, and the output rotary shaft may be axially slidably and relatively rotatably supported within the hollow armature shaft through a bearing. The output rotary shaft may have a large-diameter portion having formed on its outer circumference outer helical splines which are in mesh with inner helical splines in the clutch inner member of the over-running clutch. Alternatively, the pinion may be snuggly fitted and secured to a small-diameter end portion of the output rotary shaft.

6 Claims, 5 Drawing Sheets

COAXIAL ENGINE STARTER

This is a divisional of application No. 07/481,077 filed Feb. 16, 1990, now U.S. Pat. No. 5,044,212 issued Sep. 3, 1991.

BACKGROUND OF THE INVENTION

This invention relates to an engine starter and, more particularly, to an engine starter in which an output rotary shaft driven by an electric motor is axially slided so that a pinion gear disposed on a front end of the output rotary shaft is brought into engagement with an engine ring gear.

One example of a conventional coaxial engine starter for starting an internal combustion engine is disclosed in Japanese Laid-Open No. 63-90665. According to the conventional coaxial engine starter 1 shown in FIG. 1, a d. c. electric motor 2 has a hollow armature rotary shaft 3 and a plunger rod 4a of a solenoid switch 4 positioned at the rear end of the d.c. motor 2 is inserted into an inner passage 3a of the armature rotary shaft 3 so that the inserted front end of the plunger rod 4a abuts against the rear end of an output rotary shaft 5 coaxially disposed at the front end of the armature rotary shaft 3. The output rotary shaft 5 is axially slidably and rotatably supported by a bearing 8 disposed within the inner passage 3a of the armature rotary shaft 3, whereby the output rotary shaft 5 can be pushed forward when the push rod 4a of the solenoid switch 4 is actuated.

It is seen that a sun gear 10a is formed on the outer circumference of the front end of the armature rotary shaft 3 and a plurality of planetary gears 10b are in mesh with the sun gear 10a. These planetary gears 10b also mesh with an inner gear 10c formed in the inner circumferential surface of the front bracket 7 and are rotatably supported by shafts 10d secured on a clutch outer member 9a of an over-running clutch 9. The sun gear 10a, the planetary gears 10b, the inner gear 10c, the shafts 10d and the clutch outer member 9a together constitute a planetary speed reduction gear 10 which reduces the rotational speed of the armature rotary shaft 3.

On the output rotary shaft 5, an over-running clutch 9 is mounted, of which clutch inner member 9b is engaged with the output rotary shaft 5 by helical splines 5a, so that the output rotary shaft 5 is allowed to axially slide while being rotated by the clutch inner member 9b. A compression spring 9c is disposed between the clutch inner member 9b and the splined portion 5a of the output rotary shaft 5. On the front end of the output rotary shaft 5, a pinion 6 which engages and disengages relative to an engine ring gear (not shown) is mounted by straight splines 6a formed in the inner circumference of the pinion 6 and splines 6b formed on the outer circumference of the output rotary shaft 5. A stopper 12 is mounted on the output rotary shaft 5 by a stop ring 13. A compression spring 14 is disposed between a step of the pinion 6 and the output rotary shaft 5. When the output rotary shaft 5 is moved forward, the pinion 6 meshes the engine ring gear to rotate the engine.

In the coaxial engine starter of the above construction, when it is desired to increase the torque for starting the engine or to reduce the size of the electric motor 2 by increasing the speed reduction ratio between the pinion 6 and the engine ring gear, the number of teeth of the pinion 6 may be decreased. However, when the number of teeth of the pinion 6 is decreased, the dedendum circle of the pinion is decreased, so that the thickness of the base portion of the pinion 6 or the diameter of the output rotary shaft 5 of the portion on which the pinion 6 is mounted must be decreased. Therefore, the strength of the pinion 6 or the output shaft 5 will become insufficient. Also, the splines 6a and 6b, the spring 14 as well as the stopper 12 with the stop ring 13 are necessary to mount the pinion 6 on the front end of the output rotary shaft 5, whereby the number of parts is increased and the assembly time is elongated.

On the other hand, while the above problem of insufficient strength of the pinion 6 or the output rotary shaft 5 can be solved by integrally forming the pinion 6 on the output rotary shaft 5, such the output rotary shaft with the integral pinion cannot be assembled into the clutch inner member 9b of the over-running clutch 10 because the output rotary shaft 5 has the large-diameter splined portion 5a which engages with the helical splines 9c formed in the inner circumference of the clutch inner member 9b of the over-running clutch 9.

SUMMARY OF THE INVENTION

Accordingly, one of the objects of the present invention is to provide a coaxial engine starter free from the above-discussed problems.

Another object of the present invention is to provide a coaxial engine starter in which the engine starting torque can be increased without decreasing the mechanical strength of the starter parts.

Another object of the present invention is to provide a coaxial engine starter in which the d.c. motor can be decreased in size without decreasing the mechanical strength of the starter parts.

Still another object of the present invention is to provide a coaxial engine starter in which the number of the parts are small.

With the above objects in view, the coaxial engine starter of the present invention comprises an electric motor having a hollow armature rotary shaft, a solenoid switch for energizing the electric motor and having a push rod extending into the hollow armature rotary shaft, an output rotary shaft having a pinion disposed on a front end thereof, the output rotary shaft being axially slidable relative to the armature rotary shaft to move the pinion into and out of engagement with an engine ring gear. According to the present invention, a clutch outer member of an over-running clutch unit is mounted on the output rotary shaft and is connected to the electric motor for being rotated thereby, and a clutch inner member driven by the clutch outer member through a plurality of rollers is provided with helical splines on its inner circumferential surface. In order to transmit a rotational force from the clutch inner member to the output rotary shaft through splines, a ring member having teeth on its outer circumference and in engagement with the helical splines of the clutch inner member, and a stopper for limiting axial movement of the ring member on the output rotary shaft beyond the stopper are disposed. The pinion may be integral with the output rotary shaft, and the output rotary shaft may be axially slidably and relatively rotatably supported within the hollow armature shaft through a bearing. The output rotary shaft may have a large-diameter portion having formed on its outer circumference outer helical splines which are in mesh with inner helical splines in the clutch inner member of the over-running clutch. Alternatively, the pinion may be snuggly fitted and secured to a small-diameter end portion of the output rotary shaft.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE INVENTION EMBODIMENTS

Figure 2:
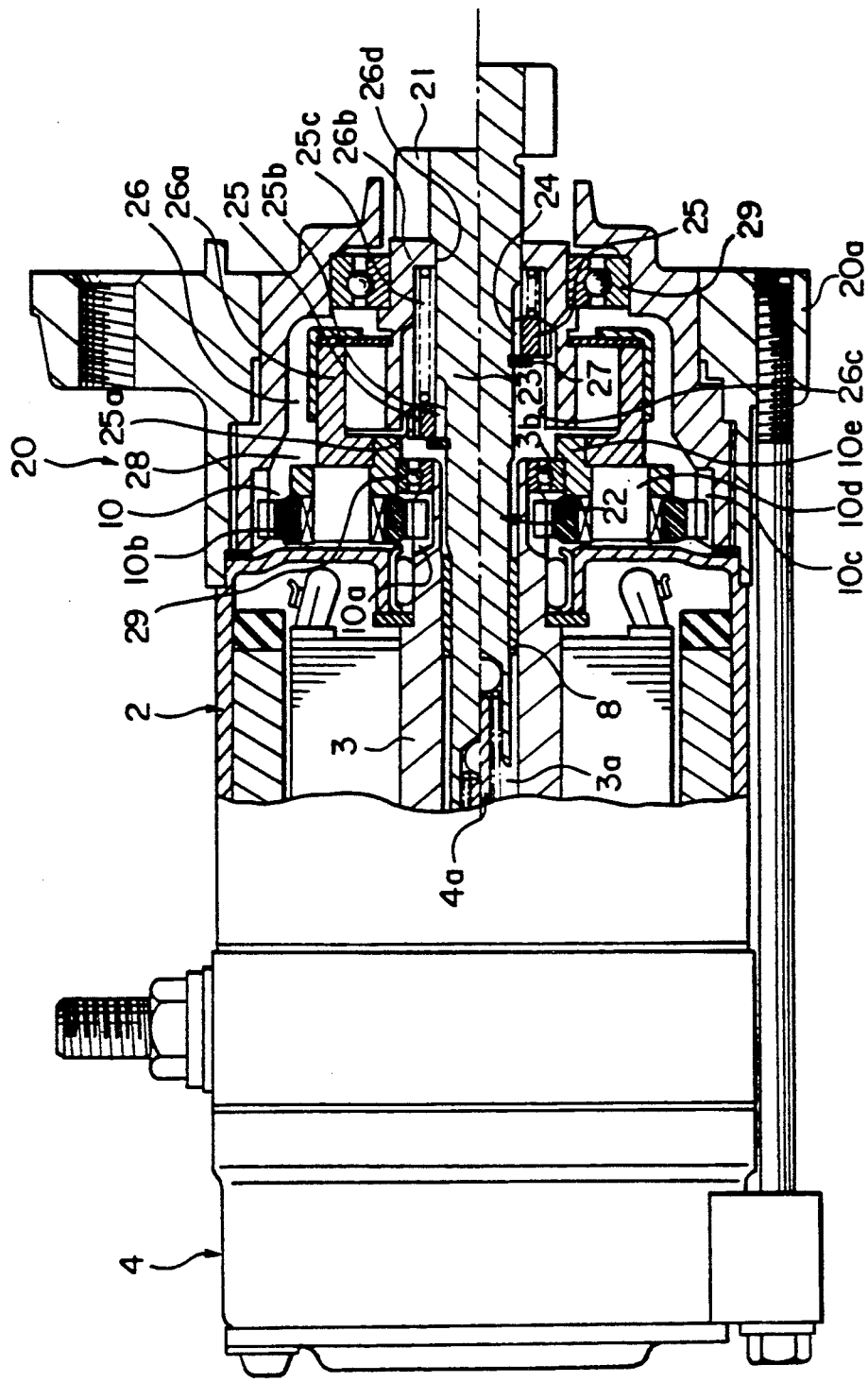
FIG. 2 is a partial sectional front view of the coaxial engine starter of one embodiment of the present invention.

In FIG. 2 which illustrates in front view a coaxial engine starter of one embodiment of the present invention, the coaxial engine starter 20 comprises an electric motor 2 having a hollow armature rotary shaft 3, a solenoid switch 4 for energizing the electric motor 2 and having a push rod 4a extending into the hollow armature rotary shaft 3 and an output rotary shaft 22 having a pinion 21 disposed on one end thereof which is axially slidable to move the pinion 21 into and out of engagement with an engine ring gear (not shown).

In the illustrated embodiment, the output rotary shaft 22 comprises a shaft portion 23 supported by the bearing 8 by the hollow armature shaft 3 and the pinion 21 integrally formed on a front end of the shaft portion 23. The shaft portion 23 has on its outer circumference straight splines 24 on which a ring member 25 is slidably engaged with its inner teeth 25b. An annular stopper 27 is secured on the shaft portion 22 of the output rotary shaft 23 for limiting axial movement of the ring member 25 on the output rotary shaft 22 beyond the stopper 27 and preventing the ring member 25 from coming off from the splined portion of the shaft portion 23. A compression spring 25c is disposed between the ring member 25 and the clutch inner member 26b in order to urge the ring member 25 against the annular stopper 27. The ring member 25 has on its outer circumference a plurality of teeth 25a which are in engagement with inner helical splines 26c of a clutch inner member 26b of an over-running clutch unit 26.

The over-running clutch unit 26 is mounted between the output rotary shaft 22 and the planetary speed reduction gear 10 mounted on the armature shaft 3 for unidirectionally transmitting the relative rotation therebetween. The over-running clutch unit 26 comprises a clutch outer member 26a, a clutch inner member 26b rotatably mounted on the output rotary shaft 23 and a plurality of rollers 26d between the clutch outer member 26a and the clutch inner member 26b for transmitting the torque between these members 26a and 26b. The clutch inner member 26b includes a bearing surface 26d supported by the outer circumference of the shaft portion of the output rotary shaft 22 and the inner helical splines 26c on its inner circumferential surface. The front end of the clutch inner member 26b is rotatably supported by a front bracket 20a through a bearing 29.

The coaxial engine starter 20 also comprises a planetary speed reduction gear 10 which comprises a sun gear 10a formed on the outer circumference of the front end of the armature rotary shaft 3 and a plurality of planetary gears 10b in mesh with the sun gear 10a. The planetary gears 10b also mesh with an inner gear 10c formed in the inner circumferential surface of the front bracket 20a and are rotatably supported by shafts 10d secured on a carrier member 10e attched to the clutch outer member 26a of an over-running clutch 9 and rotatably supported on the armature rotary shaft 3 through a bearing 29 secured on the shaft 3. The sun gear 10a, the planetary gears 10b, the inner gear 10c, the shafts 10d and the carrier member 10e together constitute the planetary speed reduction gear 10 which reduces the rotational speed of the armature rotary shaft 3. The carrier member 10e has a cylindrical portion which is press-fit within the bore of the clutch outer member 26a so that they are securely connected during usual operation of the starter but a relative circumferential slip occurs only when a rotational torque greater than a predetermined torque is applied.

In order to assemble the above-described coaxial engine starter 20, the shaft portion 23 of the output rotary shaft 22 is inserted into the clutch inner member 26a in which the spring 25c and the ring member 25 are assembled, and the inner gear 25b of the ring member 25 is caused to mesh with the straight splines 24 of the shaft portion 23 of the output rotary shaft 22, and the annular stopper 27 is fitted into a circumferential groove of the shaft portion 23 of the output rotary shaft 22, thereby assembling into one assembly. Thereafter, the clutch inner member 26b of the above-described assembly is inserted into the clutch outer member 26a, in which the rollers 10d are disposed on its cam surfaces, thereby to complete the assembly of the over-running clutch unit 26.

Thus, the output rotary shaft 23 which has the pinion 21 integrally formed on its front end can be assembled into the over-running clutch unit 26, the number of the teeth of the pinion 21 can be decreased without posing the previously-discussed problem of lessened mechanical strength.

When the solenoid switch 4 is actuated, the output rotary shaft 22 is axially noved forward to cause the pinion 21 on the front end of the output rotary shaft 22 to project from the front bracket 20a to mesh with the engine ring gear (not shown). Immediately before the above meshing of the pinion 21 with the ring gear (not shown), the d.c. motor 2 is energized to cause the rotation thereof which is transmitted to the output rotary shaft 22 through the planetary speed reduction gear 10, the over-running clutch unit 26 and through the ring member 25.

Figure 1:
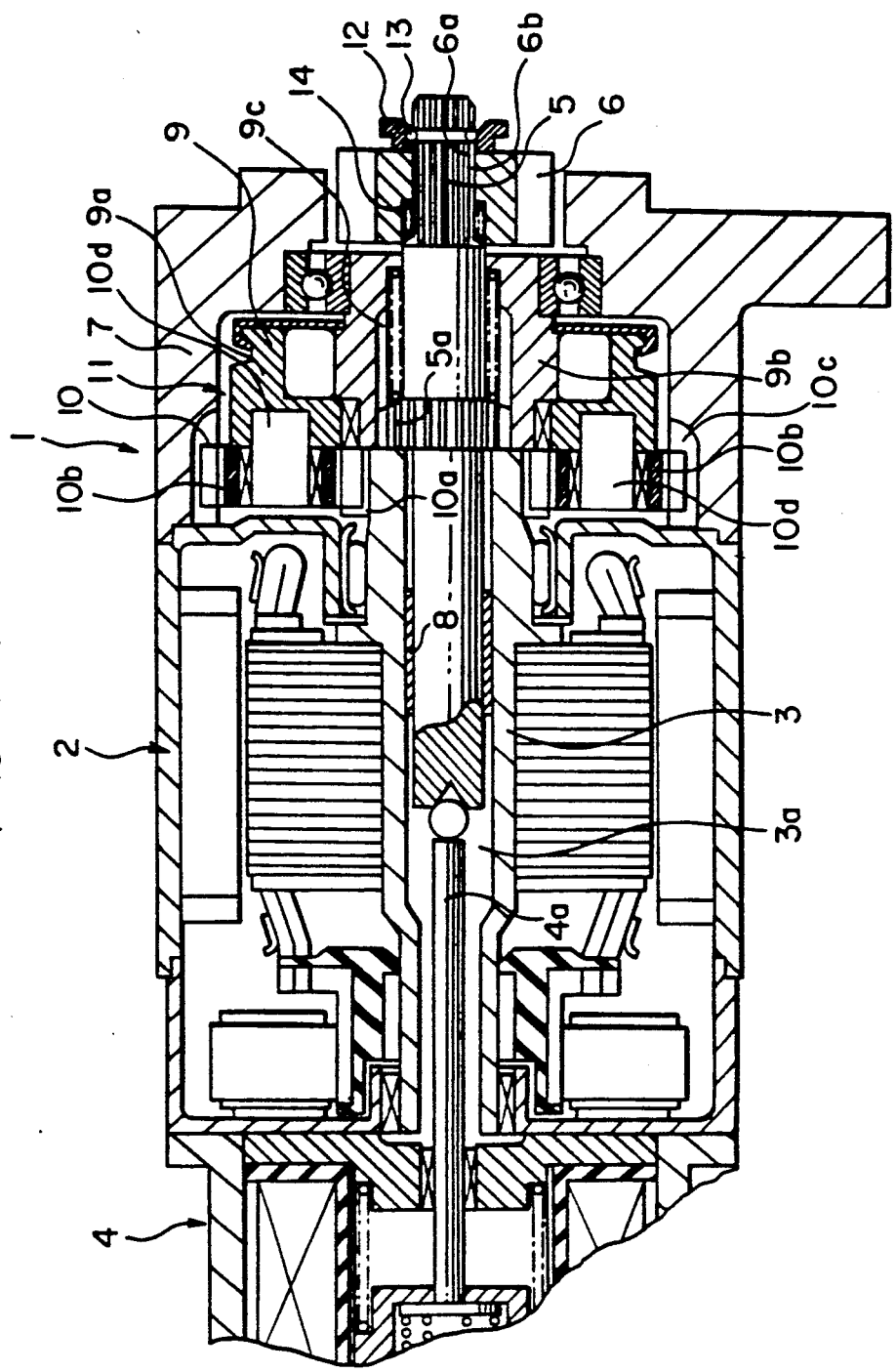
FIG. 1 is a partial sectional front view of a conventional coaxial engine starter.
Figure 3:
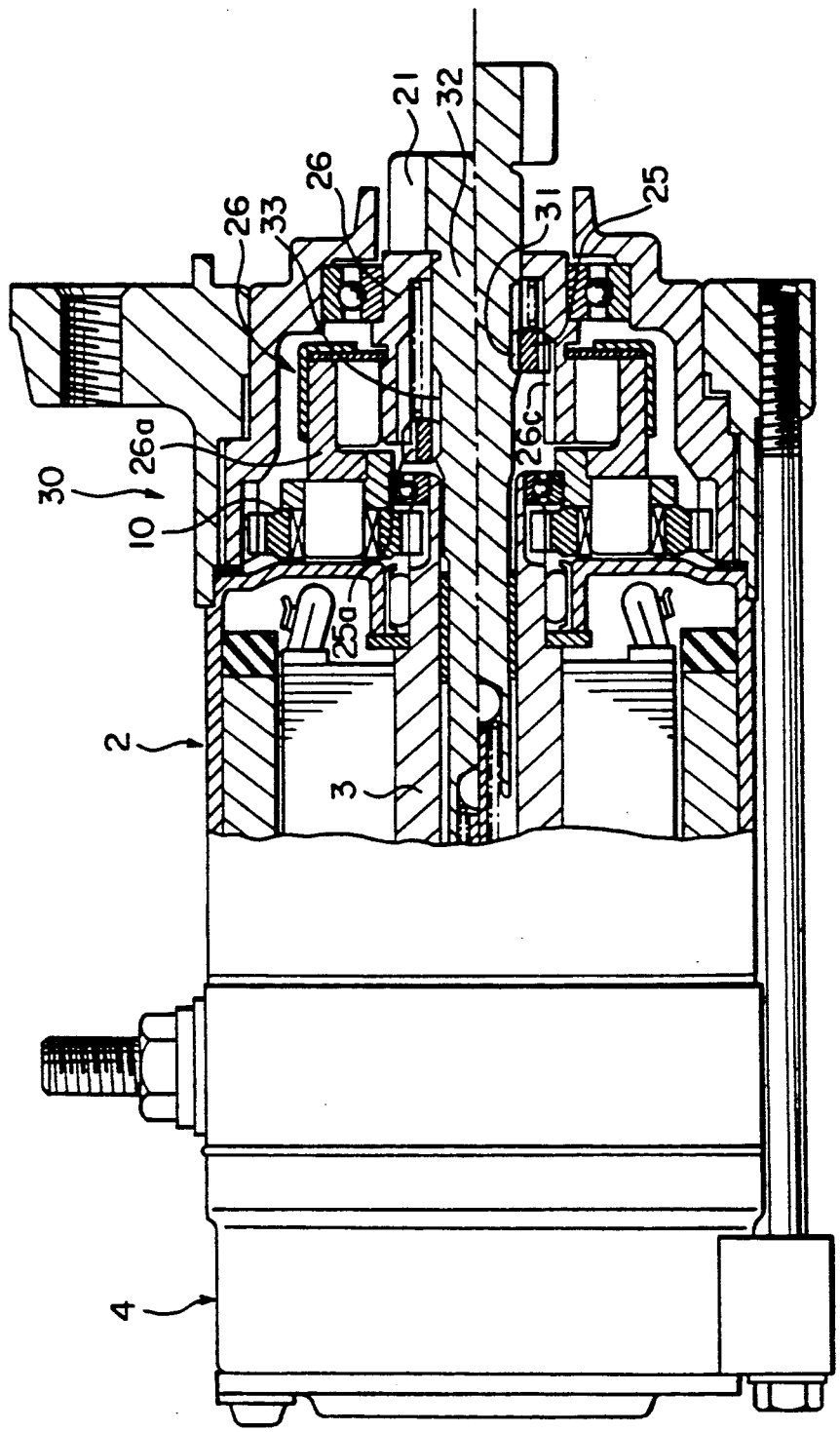
FIG. 3 is a partial sectional front view of the coaxial engine starter of another embodiment of the present invention.

FIG. 3 illustrates a coaxial engine starter 30 of another embodiment of the present invention. In the coaxial starter 20 shown and described in conjunction with FIG. 2, the shaft portion 23 of the output rotary shaft 22 has formed therein the straight splines 24 with which the inner gear 25b of the ring member 25 meshes, and the annular stopper 27 is fitted on the shaft portion 23 to prevent the falling of the ring member 25. However, it is also possible to replace such the output rotary shaft 22 having the straight splines 24 with an output rotary shaft 32 having formed therein helical splines 31 which have closed ends or stoppers on every other spline as disclosed in Japanese Utility Model Laid-Open No. 55-53727. When the ring member 25 is to be mounted to such the output rotary shaft 32 with the helical splines 31, the output rotary shaft 32 is inserted into the center of the ring member 25 which is assembled within the inner circumference of the clutch inner member 26b, then the ring member 25 is engaged with the helical splines 31 and passed through them, rotating the ring member 25 by an angle corresponding to the circumferential pitch of the splines 31 by utilizing the escape way 33 formed in the output rotary shaft 32, and finally bringing the teeth of the ring member 25 into mesh with the helical splines 31. In this state, the ring member 25 cannot come off the output rotary shaft 32 because the end portions of the teeth 25a of the ring member 25 abut against the end walls of the closed spline grooves 31. Therefore, the separate stopper member 27 as shown and described in conjunction with the previous embodiment shown in FIG. 1 is not necessary.

Figure 4:
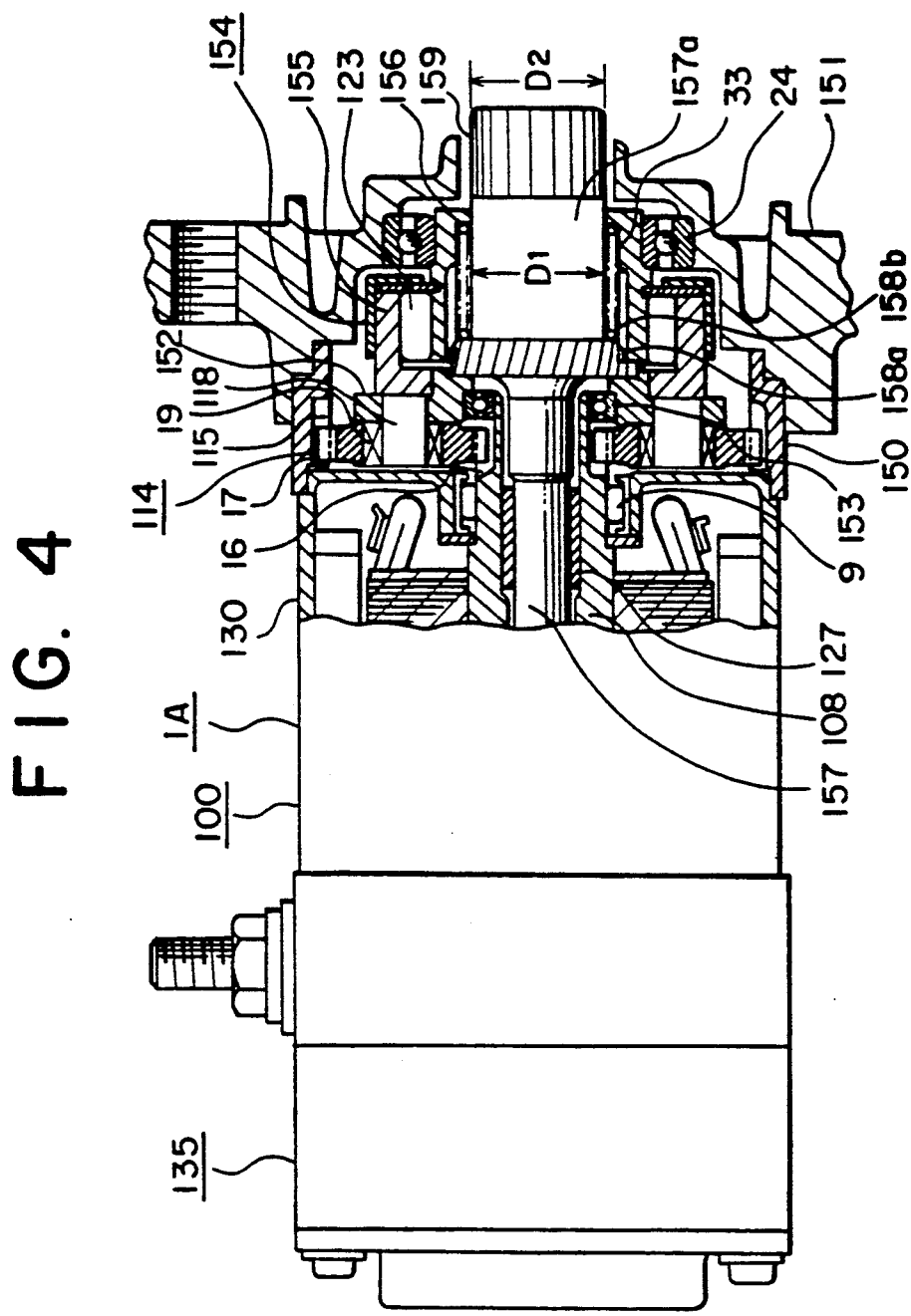
FIG. 4 is a partial sectional front view of the coaxial engine starter of a further embodiment of the present invention.

FIG. 4 illustrates a coaxial engine starter 1A of another embodiment of the present invention, in which the engine starter 1A comprises an intermediate bracket 150 attached to the iron yoke 130 and having an inner gear 115 formed in its inner circumference and a front bracket 151 attached to the intermediate bracket 150. The starter 1A also comprises a d.c. motor 100 having an armature rotary shaft 108 which, through a bearing 153, rotatably supports a support ring 152 having pivot pins 118 secured thereon. Further, an over-running clutch 154 is disposed having a clutch outer member 155 secured to the support ring 152, a clutch inner member 156 disposed inside of the clutch outer member 155 and a plurality of rollers 123 disposed between the respective cam surfaces of the outer and the inner members 155 and 156 for unidirectionally transmitting the torque therebetween. The clutch inner member 156 is mounted on the output rotary shaft 157 rotatably and axially slidably supported within the armature rotary shaft 108 through a bearing 127. Although not illustrated the rear end of the output rotary shaft 157 is arranged to be pushed by a push rod of a solenoid switch 135. The output rotary shaft 157 has large-diameter helical splines 158a which mesh with the helical splines 158b formed in inner circumference of the clutch inner member 156, and the output rotary shaft 157 also has formed at the outer circumference of the front end therof a pinion 159.

The pinion 159 has an outer diameter D2 smaller than that of the conventional design and has a smaller number of teeth, but a sufficient mechanical strength is obtained since the pinion teeth are formed on the solid dedendum portion with no bore. Also, the shaft portion of the output rotary shaft 157 has an outer diameter D1 larger than the outer diameter of the shaft portion of the output rotary shaft of the conventional design. Further, the outer diameter of the base or the dedendum circle of the pinion 159 of the shaft portion 157a of the output rotary shaft 157 is larger than the outer diameter of the base portion of the straight splines 6a of the conventional output rotary shaft 5, exhibiting a sufficiently large mechanical strength.

The operation of the coaxial engine starter of the just described embodiment is similar to that of the previous embodiment.

Figure 5:
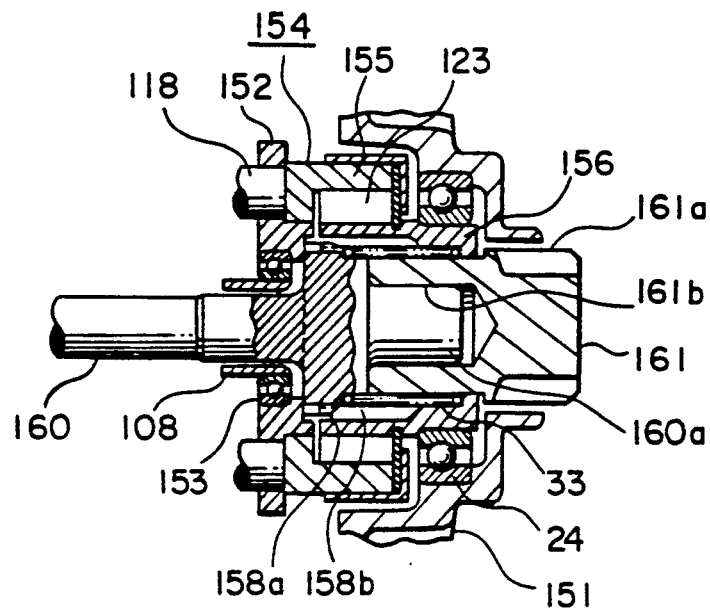
FIG. 5 is a fragmental sectional view of the engine starter of a still another embodiment of the present invention, illustrating the relationship between the pinion and the output rotary shaft.

In FIG. 5 which illustrates a coaxial engine starter of still another embodiment of the present invention, an output rotary shaft 160, which is rotatably and slidably supported by the rotary armature shaft 108 through the sleeve bearing 127 (see FIG. 4), has formed at the front end of the shaft 160 the helical splines 158a which is in engagement with the inner helical splines 158b formed in the inner circumference of the clutch inner member 156. The output rotary shaft 161 gas secured on its front shaft portion 160a a pinion shaft 161 with its bore 161b formed from the rear end is press-fit or shrink-fit onto the shaft portion 160a. The pinion shaft 161 has integrally formed a pinion gear 161a on the outer circumference of its front end.

The rear end of the pinion shaft 161 has a diameter larger than that of the base portion of the pinion gear, so that a sufficient mechanical strength is obtained even with the central bore 161b. Also, while the outer diameter of the base portion of the pinion gear 161a is smaller than that of the conventional pinion gear, a sufficient mechanical strength can be obtained because the base portion of the pinion gear 161a is solid. Further, the diameter of the shaft portion 160a of the output rotary shaft 160 can be made larger than the outer diameter of the base portion of the conventional splines 6a such as the one shown in FIG. 1, exhibiting a higher strength.

The engagement between the pinion shaft 161 and the output rotary shaft 160 can be arranged such that a slippage occurs at the press-fit or shrink-fit engaging surface between the pinion shaft 161 and the output rotary shaft 160 when an excessively large torque is applied, thereby to provide a function of a torque limiter.

Figure 6:
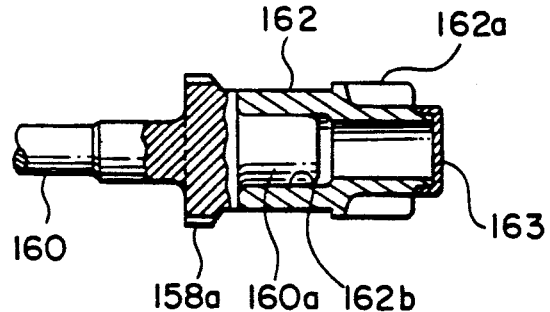
FIG. 6 is a fragmental sectional front view of another embodiment of the present invention illustrating a modified arrangement of the pinion and the output rotary shaft.

FIG. 6 is a fragmental sectional front view of another embodiment of the present invention illustrating a modified arrangement of the pinion and the output rotary shaft. According to this arrangement, a hollow pinion shaft 162 having an integral pinion gear 162a and a bore 162b is press-fit or shrink-fit over the shaft portion 160a of the output rotary shaft 160. The opening at the front end of the pinion shaft 162 is covered by a cap 163.

Since the central bore 162b for fitting over the shaft portion 160a of the output rotary shaft 160 extends through the pinion shaft 161, the machining of such the bore 162b can be relatively easily achieved with a very high accuracy. This is not the case with the arrangement illustrated in FIG. 5 in which the pinion shaft 161 has the bore 161b which is a blind hole.

The pinion 162a has an outer diameter and the number of teeth smaller than those of the conventional arrangement shown in FIG. 1. However, since the outer diameter of the rear end of the pinion shaft 162 is larger than the diameter of the base portion of the pinion 162a, the pinion shaft 162 has a sufficient mechanical strength even when the through bore is provided. Also, since the pinion 162a is integral with the rear end portion and the radial dimension of the base portion can be made sufficiently thick, a sufficient mechanical strength as compared with that of the conventional desing can be obtained.

Figure 7:
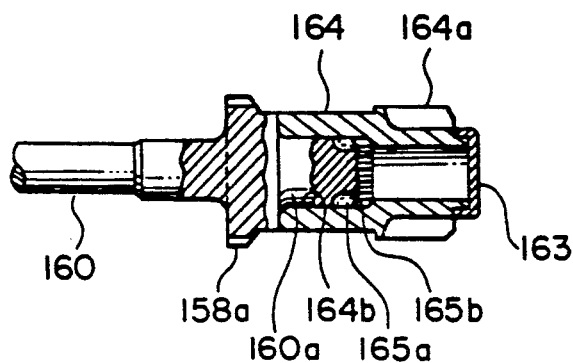
FIG. 7 is a view similar to FIG. 6 but illustrating another arrangement of the pinion mounted on the output rotary shaft.

FIG. 7 is a view similar to FIG. 6 but illustrating another arrangement of a hollow pinion shaft 164 having a pinion 164a integrally formed on the front end of the pinion shaft 164 and the output rotary shaft 160. The pinion shaft 164 has paratially extending inner straight splines 165b within the through bore 164b which engage with outer splines 165a formed on the front end of the shaft portion 160a of the output rotary shaft 160. This arrangement provides a firm mechanical engagement through the splines 165a and 165b in addition to the previously-described press or shrink-fit engagement between the pinion shaft 164 and the output rotary shaft 160.

As has been described, the coaxial engine starter of the present invention comprises an electric motor having a hollow armature rotary shaft, a solenoid switch for energizing the electric motor and having a push rod extending into the hollow armature rotary shaft, an output rotary shaft having a pinion disposed on a front end thereof, the output rotary shaft being axially slidable relative to the armature rotary shaft to move the pinion into and out of engagement with an engine ring gear. A clutch outer member of an over-running clutch unit is mounted on the output rotary shaft and is connected to the electric motor for being rotated thereby, and a clutch inner member driven by the clutch outer member through a plurality of rollers is provided with helical splines on its inner circumferential surface. In order to transmit a rotational force from the clutch inner member to the output rotary shaft through splines, a ring member having teeth on its outer circumference and in engagement with the helical splines of the clutch inner member, and a stopper for limiting axial movement of the ring member on the output rotary shaft beyond the stopper are disposed.

The pinion may be integral with the output rotary shaft, and the output rotary shaft may be axially slidably and relatively rotatably supported within the hollow armature shaft through a bearing. The output rotary shaft may have a large-diameter portion having formed on its outer circumference outer helical splines which are in mesh with inner helical splines in the clutch inner member of the over-running clutch. Alternatively, the pinion may be snuggly fitted and secured to a small-diameter end portion of the output rotary shaft.

Therefore, the engine starting torque of the coaxial engine starter can be increased without decreasing the mechanical strength of the starter parts, and the d.c. motor can be decreased in size without decreasing the mechanical strength of the starter parts. Also, the number of the parts of the coaxial engine starter can be made small.

What is claimed is:

1. An engine starter comprising:
    an electric motor having a hollow armature rotary shaft;
    a solenoid switch for energizing said electric motor and having a push rod extending into said hollow armature rotary shaft;
    an output rotary shaft having a pinion disposed on one end thereof, said output rotary shaft being axially slidable to move said pinion into and out of engagement with an engine ring gear;
    an over-running clutch unit mounted on said output rotary shaft and having a clutch outer member connected to an electric motor for being rotated thereby, and a clutch inner member driven by said clutch outer member through a plurality of rollers and including helical splines on its inner circumferential surface;
    a splined ring member having teeth on its inner and outer circumference, said splined ring member being mounted on said output rotary shaft with said inner circumference teeth in slidable engagement with splines formed on said output rotary shaft and with said outer circumference teeth in engagement with said helical splines of said clutch inner member; and
    stopper means for limiting axial movement of said ring member on said output rotary shaft beyond said stopper means.

2. An engine starter as claimed in claim 1, wherein said stopper means is an annular stop ring fitted onto the output rotary shaft.

3. An engine starter as claimed in claim 1, wherein said stopper means is an end wall of a closed-end spline of the inner splines on the clutch inner member.

4. An engine starter as claimed in claim 1, wherein said stopper means being a large-diameter portion having formed on its outer circumference outer helical splines which are in mesh with inner helical splines in the clutch inner member of said over-running clutch.

5. An engine starter as claimed in claim 1, wherein said splines formed on said output rotary shaft are helical splines.

6. An engine starter as claimed in claim 1, wherein said splines formed on said output rotary shaft are straight splines.

* * * * *